(12) United States Patent
Ghosh et al.

(10) Patent No.: US 11,816,427 B1
(45) Date of Patent: Nov. 14, 2023

(54) AUTOMATED DATA CLASSIFICATION ERROR CORRECTION THROUGH SPATIAL ANALYSIS USING MACHINE LEARNING

(71) Applicant: INTUIT INC., Mountain View, CA (US)

(72) Inventors: Mithun Ghosh, Bangalore (IN); Vignesh Thirukazhukundram Subrahmaniam, Bangalore (IN)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/050,092

(22) Filed: Oct. 27, 2022

(51) Int. Cl.
*G06N 3/08* (2023.01)
*G06F 40/18* (2020.01)
*G06F 40/103* (2020.01)

(52) U.S. Cl.
CPC ............ *G06F 40/18* (2020.01); *G06F 40/103* (2020.01); *G06N 3/08* (2013.01)

(58) Field of Classification Search
CPC ...................................................... G06N 3/08
See application file for complete search history.

(56) References Cited

U.S. PATENT DOCUMENTS

| | | | |
|---|---|---|---|
| 2019/0370323 A1* | 12/2019 | Davidson | G10L 15/26 |
| 2020/0050941 A1* | 2/2020 | Zhuang | G06N 3/044 |
| 2020/0293712 A1* | 9/2020 | Potts | G16H 10/60 |
| 2021/0026874 A1* | 1/2021 | Ikeda | G06F 40/30 |
| 2022/0093088 A1* | 3/2022 | Rangarajan Sridhar | G06F 16/338 |
| 2022/0198130 A1* | 6/2022 | Tan | G06F 40/253 |
| 2022/0284280 A1* | 9/2022 | Walters | G06N 20/00 |
| 2022/0335517 A1* | 10/2022 | Wellmann | G06F 40/20 |

* cited by examiner

*Primary Examiner* — Selene A. Haedi
(74) *Attorney, Agent, or Firm* — Patterson + Sheridan, LLP

(57) ABSTRACT

Aspects of the present disclosure provide techniques for automated data classification error correction through machine learning. Embodiments include receiving a set of predicted labels corresponding to a set of consecutive text strings that appear in a particular order in a document, including: a first text string corresponding to a first predicted label; a second text string that follows the first text string in the particular order and corresponds to a second predicted label; and a third text string that follows the second text string in the particular order and corresponds to a third predicted label. Embodiments include providing inputs to a machine learning model based on: the third text string; the second text string; the second predicted label; and the first predicted label. Embodiments include determining a corrected third label for the third text string based on an output provided by the machine learning model in response to the inputs.

13 Claims, 7 Drawing Sheets

AUTOMATED DATA CLASSIFICATION ERROR CORRECTION THROUGH SPATIAL ANALYSIS USING MACHINE LEARNING

INTRODUCTION

Aspects of the present disclosure relate to techniques for correcting errors in data classification through spatial analysis using machine learning. In particular, techniques described herein involve utilizing labels of text strings that appear prior to a given text string in a document such as a spreadsheet as features for determining a corrected label for the given text string using a machine learning model.

BACKGROUND

Every year millions of people, businesses, and organizations around the world utilize software applications to assist with countless aspects of life. In some cases, a software application may automatically classify data, such as for importing data from a document into the application. However, automatic classifications may be inaccurate in some cases. For example, techniques for classifying text based only on the text itself may result in erroneous classifications. The string "35759" may, for example, be incorrectly classified as a zip code based on automated analysis when the number actually refers to a monetary amount.

As such, there is a need in the art for improved techniques of reducing and/or correcting incorrect automated data classifications.

BRIEF SUMMARY

Certain embodiments provide a method for automated data classification error correction through machine learning. The method generally includes: receiving a set of predicted labels corresponding to a set of consecutive text strings that appear in a particular order in a document, wherein the set of consecutive text strings comprises: a first text string corresponding to a first predicted label of the set of predicted labels; a second text string that follows the first text string in the particular order and corresponds to a second predicted label of the set of predicted labels; and a third text string that follows the second text string in the particular order and corresponds to a third predicted label of the set of predicted labels; providing one or more inputs to a machine learning model based on: the third text string; the second text string; the second predicted label; and the first predicted label; determining a corrected third label for the third text string based on an output provided by the machine learning model in response to the one or more inputs; replacing the third predicted label with the corrected third label for the third text string; and performing, by a computing application, one or more actions based on the third text string and the corrected third label.

Other embodiments provide a method for training a machine learning model. The method generally includes: receiving training data comprising a set of known labels corresponding to a set of consecutive text strings that appear in a particular order in a document, wherein the set of consecutive text strings comprises: a first text string corresponding to a first known label of the set of known labels; a second text string that follows the first text string in the particular order and corresponds to a second known label of the set of known labels; and a third text string that follows the second text string in the particular order and corresponds to a third known label of the set of known labels; providing one or more inputs to a machine learning model based on: the third text string; the second text string; the second known label; and the first known label; determining a predicted third label for the third text string based on an output provided by the machine learning model in response to the one or more inputs; and adjusting one or more parameters of the machine learning model based on a comparison of the predicted third label with the known third label.

Other embodiments provide a system comprising one or more processors and a non-transitory computer-readable medium comprising instructions that, when executed by the one or more processors, cause the system to perform a method. The method generally includes: receiving a set of predicted labels corresponding to a set of consecutive text strings that appear in a particular order in a document, wherein the set of consecutive text strings comprises: a first text string corresponding to a first predicted label of the set of predicted labels; a second text string that follows the first text string in the particular order and corresponds to a second predicted label of the set of predicted labels; and a third text string that follows the second text string in the particular order and corresponds to a third predicted label of the set of predicted labels; providing one or more inputs to a machine learning model based on: the third text string; the second text string; the second predicted label; and the first predicted label; determining a corrected third label for the third text string based on an output provided by the machine learning model in response to the one or more inputs; replacing the third predicted label with the corrected third label for the third text string; and performing, by a computing application, one or more actions based on the third text string and the corrected third label.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
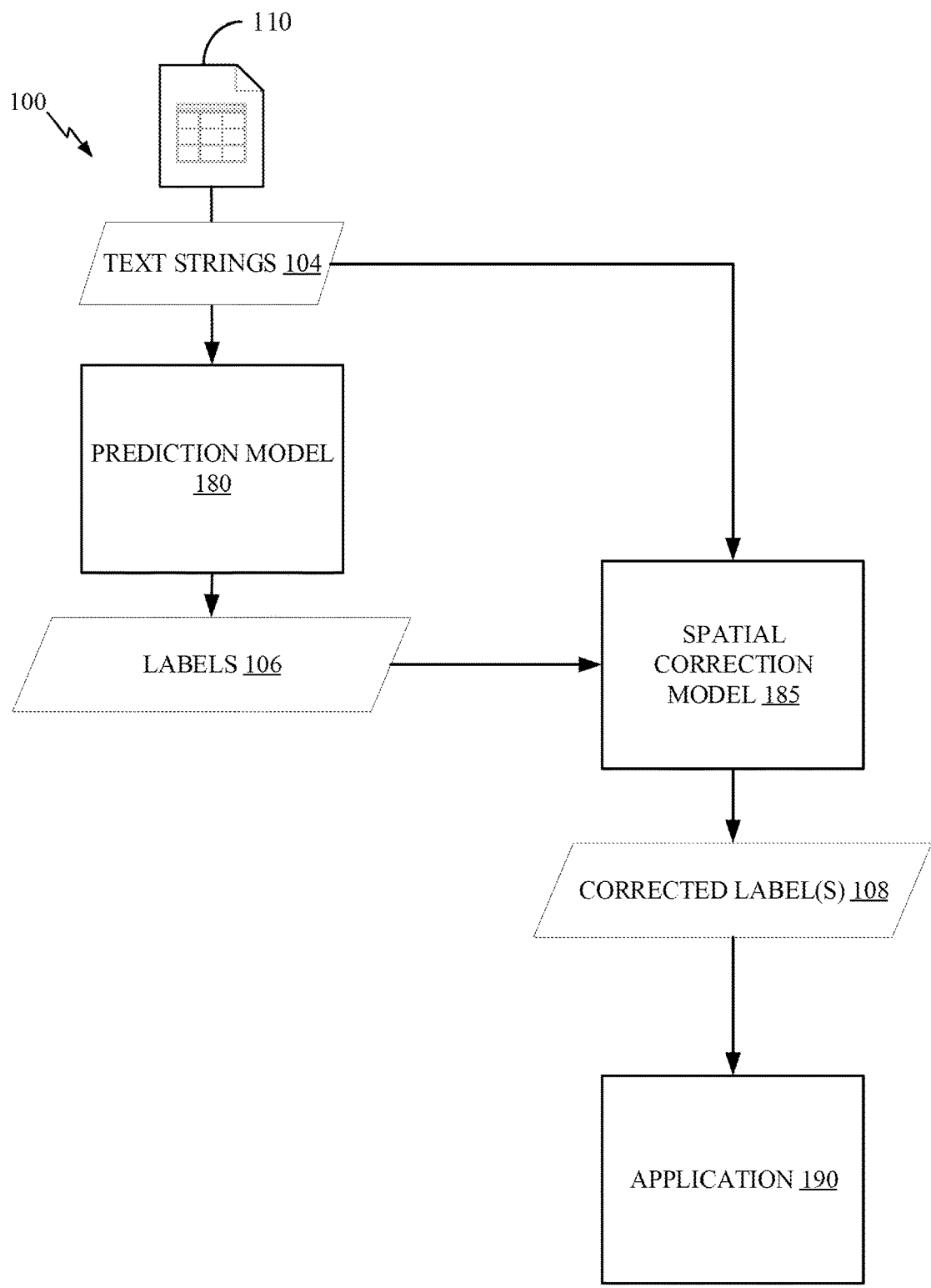
FIG. 1 depicts an example of utilizing a machine learning model to correct an automated classification of a text string from a document based on spatial analysis as described herein.

Aspects of the present disclosure provide apparatuses, methods, processing systems, and computer readable mediums for training and utilizing a machine learning model to correct automated classifications of text strings based on spatial analysis.

According to certain embodiments, machine learning techniques are utilized in order to correct automated classifications (e.g., determined by another machine learning model or technique) of text strings in documents such as spreadsheets, such as to enable and/or improve automated import of data from such documents. Spreadsheets generally contain granular strings of text within separate "cells" organized in rows and columns. Thus, a given text string in a spreadsheet may be understood more completely based on the "spatial" context in which the given text string appears (e.g., the text in preceding rows and/or columns). For example, the string "35759" may be automatically classified as a zip code by a machine learning model that analyzes the text of the string itself. However, the string may actually be a monetary amount, and the spatial context of the string may make this clear. For example, if the strings preceding "35759" in the document (e.g., in previous rows of a spreadsheet) are "220421" and "344203", which do not conform to the expected pattern of a zip code, it may become more evident that "35759" is not a zip code in this context. Furthermore, if the strings preceding "35759" in the spreadsheet were classified as "amounts" by the machine learning model, this may further clarify that "35759" is an amount rather than a zip code. Thus, a spatial correction model may be trained to determine corrected classifications for text strings based on spatial context information such as preceding text strings and predicted classifications of the preceding text strings.

As described in more detail below with respect to FIG. 2, the spatial correction model may accept as inputs the text string for which a corrected classification is sought as well as the immediately preceding text string from the document. Furthermore, the spatial correction model may accept as inputs the predicted classifications for the two immediately preceding text strings in the document. These inputs are included as examples, and other inputs are possible. The spatial correction model processes these inputs through various layers and outputs a corrected classification for the text string. As described in more detail below with respect to FIG. 3, the spatial correction model may have been trained based on historical sets of consecutive text strings (e.g., from spreadsheets) for which classifications are known (e.g., based on manual review and labeling). Thus, the spatial correction model allows for spatial context data from documents to be used for automatically correcting previous classifications of text strings from the documents.

Embodiments of the present disclosure provide multiple improvements over conventional techniques for automatic classification of text from documents. For example, by utilizing machine learning techniques to analyze text strings from documents based on spatial context information such as preceding text strings and predicted classifications of the preceding text strings, techniques described herein allow classification errors made by other techniques for automatic data classification to be automatically identified and corrected. Thus, by enabling more accurate automatic text classifications as compared to other techniques, such as those based only on the text itself, embodiments of the present disclosure constitute an improvement with respect to existing techniques for automated text classification. Furthermore, by utilizing iterative techniques in which automated classifications (e.g., including corrected automated classifications) of preceding text strings in a document are used as inputs to a machine learning model for correcting automated classifications of subsequent text strings in the document, techniques described herein provide classification accuracy that continually improves.

Embodiments of the present disclosure provide improved machine learning techniques, and allow for improved automated extraction of data from documents, particularly from spreadsheets.

Automated Extraction of Data from Spreadsheets

FIG. 1 is an illustration 100 of utilizing a machine learning model to correct an automated classification of a text string from a document based on spatial analysis as described herein.

Document 110 represents a spreadsheet that includes a plurality of text strings contained within cells that are organized into columns and rows. A spreadsheet is included as an example, and techniques described herein may be used to classify text strings from other types of documents. For example, document 110 may be generally referred to as a spatially coherent document, meaning that document 110 contains subsets of content that relate to one another based on positions of the subsets within the document. For example, document 110 may be determined to be spatially coherent based on identifying one or more header and/or footer rows and/or identifying columns, such as identifying a start row and end row and a start column and end column defining a range of data.

In one example, document 110 is a spreadsheet containing payroll data related to a business. A user of application 190 may wish to import the contents of document 110 into application 190 without manually entering the data into application 190. For example, application 190 may be a software application that provides financial services such as accounting and/or tax preparation functionality.

A prediction model 180 is used to automatically determine classifications of consecutive text strings 104 in document 110. For instance, text strings 104 may include text from a series of consecutive rows in document 110. Prediction model 180 may, for example, be a neural network. In an example, a first text string 104 may correspond to a cell in document 110, and comprises the text "CA". One or more inputs are provided to prediction model 180 based on the text string 104, and machine learning model 180 outputs a label 106 in response to the one or more inputs. For example, the label 106 may indicate that the text string 104 (e.g., including the text "CA") is classified as a "INITIALS". A similar process may be performed for each of text strings 104. One example of a machine learning model that may be used for prediction model 180 is described in co-pending U.S. patent application Ser. No. 18/050,087, by the same inventors, filed the same day as the present application, and entitled "CHARACTER LEVEL EMBEDDINGS FOR SPREADSHEET DATA EXTRACTION USING MACHINE LEARNING," the contents of which are incorporated herein by reference in their entirety. For example, prediction model 180 may have been trained based on historically classified text strings to predict classifications for text strings (e.g., based on the text of the strings themselves). Alternatively, labels 106 may be determined through a different technique, such as applying rules, regular expressions, and/or the like.

A spatial correction model 185 is used to analyze labels 106 and text strings 104 according to spatial context information in order to determine whether any of labels 106 should be corrected. As described in more detail below with respect to FIG. 2, spatial correction model 185 outputs one or more corrected labels 108 based on labels 106 and text strings 104, and the one or more corrected labels 108 are provided to application 190. In one example, a predicted label 106 for a text string 104 including the text "CA" is "INITIALS," and a corrected label 108 for the text string 104 is "STATE." For instance, the spatial context information may clarify that "CA" actually refers to the state of California rather than a person's initials.

Application 190 may use corrected label(s) 108 to perform one or more operations, such as importing text from document 110. For example, application 190 may populate a variable corresponding to a state (e.g., a state in which an employee words or resides) with a text string 104 including the text "CA" based on a corrected label 108. Thus, according to techniques described herein, the contents of document 110 may be automatically imported into application 190 with a higher level of accuracy than that provided by other techniques. Furthermore, data automatically imported into application 190 using techniques described herein may be displayed via a user interface.

In some cases a user may provide feedback with respect to corrected label(s) 108, such as based on reviewing results of an automated import via a user interface. For example, the user may provide input indicating whether a corrected label 108 is correct and/or providing a different label for a corresponding text string 104. The user feedback may be used to generate updated training data for re-training spatial correction model 180. For instance, a new training data instance comprising the corresponding text string 104 and a label that is based on the user feedback may be generated and used in a model training process. The re-trained model may then be used to determine subsequent corrected labels of text strings with improved accuracy. Training of spatial correction model 180 is described in more detail below with respect to FIG. 3.

In some embodiments, corrected label(s) 1078 may be used to re-train prediction model 180. For example, one or more training data instances may be generated, comprising one or more text strings 104 associated with corresponding corrected label(s) 108, and the training data instances may be used to re-train prediction model 180 for improved accuracy in subsequent predictions.

Example Machine Learning Model

Figure 2:
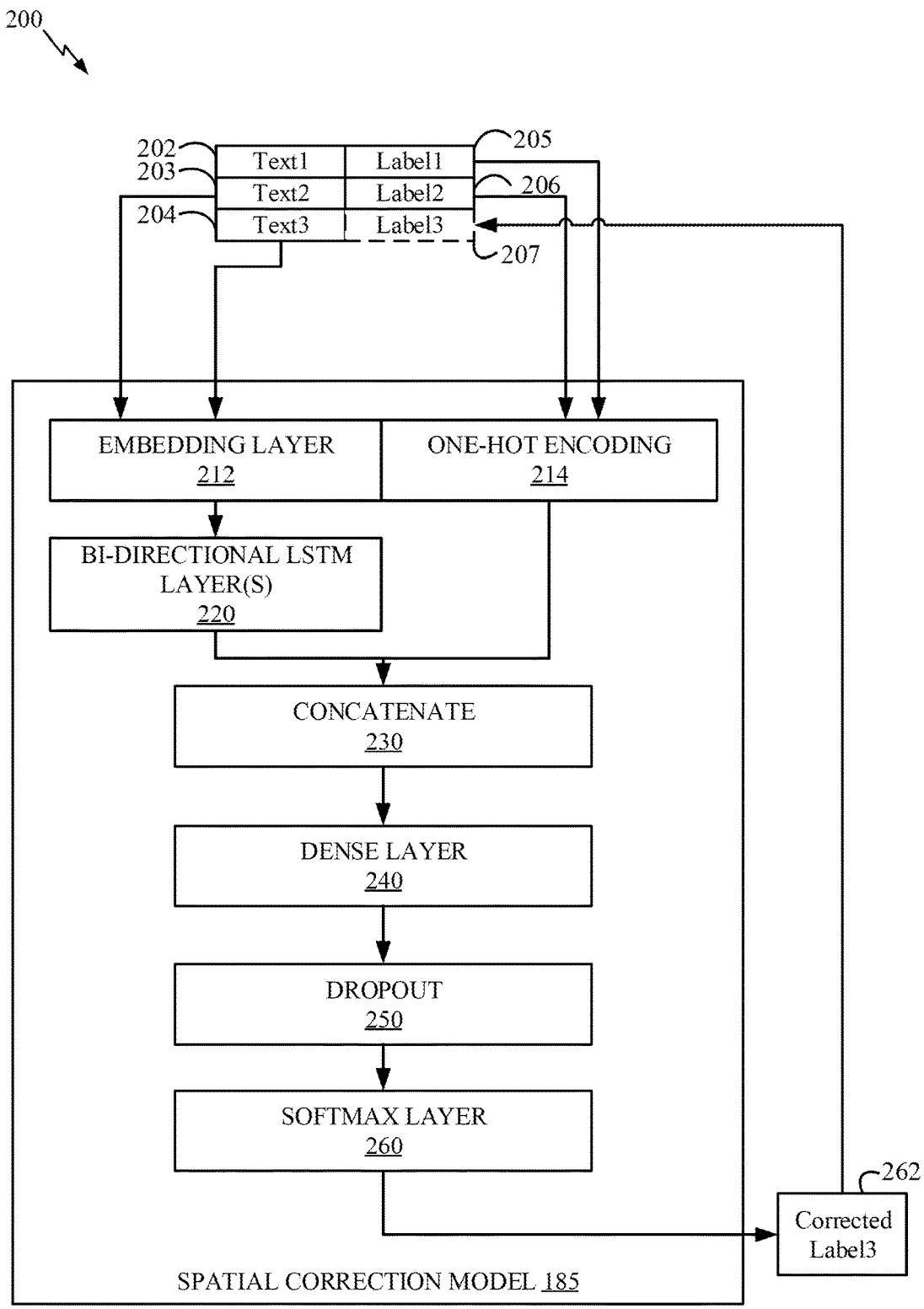
FIG. 2 depicts an example of a machine learning model that utilizes sequential data from a document and corresponding classifications for correcting automated classifications of text strings as described herein.

FIG. 2 is an illustration 200 of an example spatial correction model that utilizes sequential data from a document and corresponding classifications for correcting automated classifications of text strings as described herein. Illustration 200 comprises spatial correction model 185 of FIG. 1.

A series of text strings 202, 203, and 204 appear consecutively in a document, such as corresponding to consecutive rows in a particular column in a spreadsheet. Labels 205, 206, and 207 generally represent labels predicted through an automated process, such as using prediction model 180 of FIG. 1. For example, text strings 202, 203, and 204 may correspond to text strings 104 of FIG. 4 and labels 205, 206, and 207 may correspond to labels 106 of FIG. 1.

In the depicted example, spatial correction model 185 is used to determine a corrected label 262 for text string 204. Inputs provided to spatial correction model 185 in order to determine a corrected label for text string 204 include text string 204 itself, the immediately preceding text string 203, the label 206 corresponding to text string 203, and the label 205 corresponding to text string 202, which immediately precedes text string 203. Alternative embodiments may involve more or fewer inputs. For example, text string 202 and label 207 (e.g., the previously-predicted label for text string 204) may also be provided as inputs.

Spatial correction model may have been trained as described below with respect to FIG. 3 to process the inputs in order to determine a corrected label. The text string inputs (text strings 204 and 203) are processed through an embedding layer 212 of spatial correction model 185 that generates embeddings of the text in the text strings. According to certain embodiments, embedding layer 212 generates character-level embeddings of the text strings, such as representing each individual character in each text string as a vector in n-dimensional space. Utilizing character-level embeddings that represent individual characters rather than word embeddings that represent separate words produces better results for certain types of text that frequently contain numbers, symbols, and letters that do not form words, such as the text typically included in spreadsheets, In an example text string 204 comprises two characters and (e.g., "C" and "A"), which are used to provide inputs to spatial correction model 185. Each of the characters may be encoded, such as by generating an encoded representation of a character based on a "dictionary" or "alphabet" that maps characters to numerical identifiers such as numbers. For example, a dictionary may include a set of possible characters associated with index values (e.g., successive integers). In one (non-limiting) example the dictionary maps the characters 'ABCDEFGHIJKLMNOPQRSTUVWXYZ-abcdefghijklmnopqrstuvwxyz0123456789,;.!?\'"/\\|_:@#$%/\&*~'+-=< >( ) [ ]{ } . . . ' to index values 1-n, where n is the number of characters in the dictionary. In some cases, certain index values are used for characters that are not included in the dictionary. For example, the index value 0 may be used for any character that is not included in the dictionary. Other implementations are possible without departing from the scope of the present disclosure.

Using the example dictionary above, the character C may be mapped to the index value 3 and character A may be mapped to the index value 1. In some embodiments, encoding involves generating a one-hot encoded vector that represents the index value of a given character. For example, a one-hot encoded vector may have a number of binary values that is equal to the number of possible index values (e.g., the vector beginning with a value corresponding to the index value 0), and the ith value of the vector may be set to one if the vector represents the character corresponding to index value i, while all other values in that vector will be set to 0. For example, if the $0^{th}$ value of a one-hot encoded vector is set to 1, then the one-hot encoded vector represents the index value of 0, which may indicate an unrecognized character.

In an example, the character C is represented by the one-hot encoded vector {0, 0, 0, 1, 0, . . . . } (e.g., representing an index value of 3) and the character A is represented by the one-hot encoded vector {0, 1, 0, . . . } (e.g., representing an index value of 1). Other implementations are possible. The encoded character values may then be processed through embedding layer 212 of spatial correction model 185 where they are transformed into character-level embeddings. Embedding layer 212 may comprise, for example, one or more fully-connected layers. In an example, each node of embedding layer 212 may receive an encoded character, which may be an x-dimensional one-hot encoded vector where x is equal to the total number of possible index values, and may generate an n-dimensional vector based on the encoded character. For example, each node of embedding layer 212 may apply a matrix transformation to the x-dimensional one-hot encoded vector in order to produce an n-dimensional vector (e.g., of floating point values). The matrix used by embedding layer 212 to transform encoded characters into n-dimensional vectors may be learned through a supervised training process as described in more detail below with respect to FIG. 3, such as to optimize classification accuracy of spatial correction model 185.

Labels 205 and 206 are converted into one-hot encoded vectors at one-hot encoding stage 214, which may represent logic within spatial correction model 185 or, alternatively, may be performed prior to providing inputs to spatial correction model 185 (e.g., one-hot encoded vectors may be generated outside of the model and provided as inputs to the model). For example, a one-hot encoded vector for a label may have m values, where m is equal to the number of possible labels. Each label may be associated with an index value (e.g., 1-m) and the yth value of the vector may be set to 1 to indicate that the vector represents the label corresponding to index value y, while all other values in the vector are set to 0.

Character-level embeddings determined by embedding layer 212 are then processed through one or more bi-directional LSTM layers 220 (e.g., some embodiments include two bi-directional LSTM layers). In a neural network, each node or neuron in an LSTM layer generally includes a cell, an input gate, an output gate and a forget gate. The cell generally stores or "remembers" values over certain time intervals in both a backward direction (e.g., data input to the node) and a forward direction (e.g., data output by the node), and the gates regulate the flow of data into and out of the cell. As such, an LSTM layer hones a representation (e.g., embedding) by modifying vectors based on remembered data, thereby providing a more contextualized representation of a text sequence. A bi-directional LSTM operates in both a forward and backward direction.

It is noted that while one or more bi-directional LSTM layers 220 are shown, alternative embodiments may involve one or more standard (e.g., not bi-directional) LSTM layers.

After the character-level embeddings are honed through bi-drectional LSTM layer(s) 220, the honed character-level embeddings are concatenated with the one-hot encoded vectors of labels 205 and 206 generated at one-hot encoding stage 214 at concatenation stage 230. The output of concatenation stage 230 is then processed through a dense layer 240. Dense layer 240 represents a fully-connected layer of spatial correction model 185. Fully connected layers in a neural network are layers where all the inputs from one layer are connected to every activation unit of the next layer.

Outputs from dense layer 240 may undergo a dropout 250 in some embodiments. The term "dropout" refers to dropping out certain nodes in a neural network, such as based on a "drop probability" value that indicates how many nodes to drop. In some cases, nodes to drop are identified through random selection. For instance, if dense layer 240 has 1000 neurons (nodes) and a dropout is applied with drop probability=0.5, then 500 neurons would be randomly dropped in every iteration.

Outputs from dropout 250 are then processed through a softmax layer 260 in order to determine a corrected label 262. For example, softmax layer 260 may apply a softmax activation function to one or more outputs from dense layer 240 (e.g., that were not dropped at dropout 250) in order to determine corrected label 262. A Softmax activation function converts numeric outputs of the last linear layer of a multi-class classification neural network into probabilities by taking the exponents of each output and then normalizing each number by the sum of those exponents such that the entire output vector (e.g., including all of the probabilities) adds up to one.

Corrected label 262 may be output by spatial correction model 185, and generally represents a predicted classification of text string 204 based on the feature set [text string 204, text string 203, label 206, and label 205]. For example, corrected label 262 may correspond to a corrected label 108 of FIG. 1, indicating that the text string "CA" should be classified as a "STATE".

Corrected label 262 may be used to replace label 207, such as based on a determination that label 207 does not match corrected label 262. Thus, corrected label 262 may allow data from a spreadsheet to be more accurately classified and, therefore, automatically imported into an application with a higher level of accuracy.

Training a Spatial Correction Model

Figure 3:
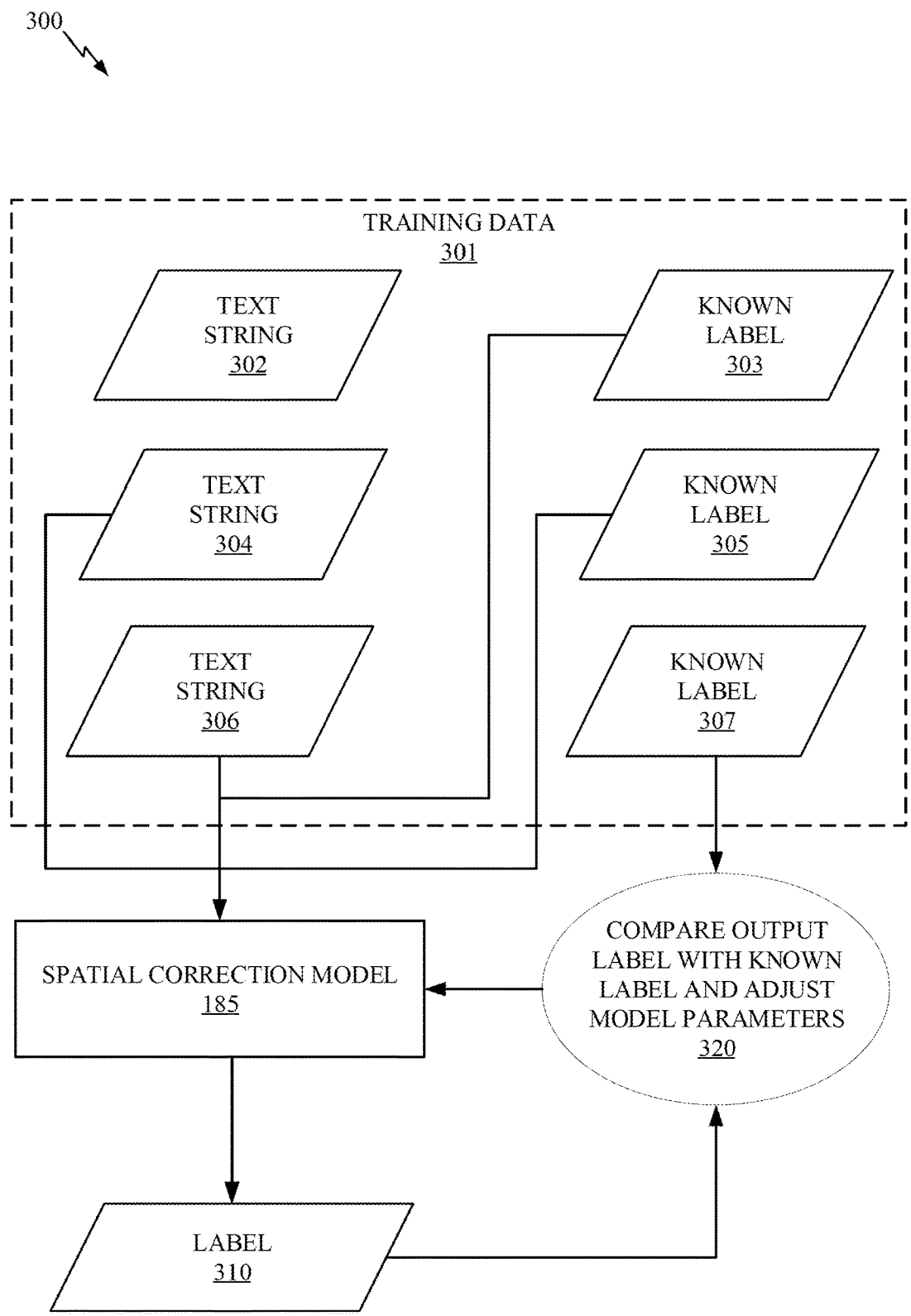
FIG. 3 depicts an example of training a machine learning model for correcting automated classifications of text strings based on spatial analysis as described herein.

FIG. 3 is an illustration 300 of an example of training a machine learning model for correcting automated classifications of text strings based on spatial analysis as described herein. Illustration 300 includes spatial correction model 185 of FIGS. 1 and 2. For example, training operations may be performed by a model training component.

Training data 301 may include a plurality of sets of consecutive text strings (represented by example consecutive text strings 302, 304, and 306) associated with known labels (represented by example known labels 303, 305, and 307). For example, training data 301 may include a plurality of text strings (e.g., from consecutive rows in a column of one or more spreadsheets) that have previously been classified by a user or expert, and the labels may indicate these known classifications.

There are many different types of machine learning models that can be used in embodiments of the present disclosure. For example, spatial correction model 185 may be a neural network. Spatial correction model 185 may also be an ensemble of several different individual machine learning models. Such an ensemble may be homogenous (i.e., using multiple member models of the same type) or non-homogenous (i.e., using multiple member models of different types). Individual machine learning models within such an ensemble may all be trained using the same subset of training data or may be trained using overlapping or non-overlapping subsets randomly selected from the training data.

Neural networks generally include a collection of connected units or nodes called artificial neurons. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network. As described in more detail above with respect to FIG. 2, spatial correction model 185 may be a neural network that comprises an embedding layer, one or more bi-drectional LSTM layers, one or more dense layers, and a softmax layer.

In some embodiments, training spatial correction model 185 is a supervised learning process that involves providing training inputs representing features of text strings (e.g., the features of text string 306 may be text string 306 and text string 304 as well as known label 305 and known label 303) as inputs to spatial correction model 185. Spatial correction model 185 processes the training inputs through its various layers and outputs predicted "corrected labels" (e.g., label 310) indicating predicted classifications with respect to the text strings represented by the inputs. Predictions may, in some embodiments, be in the form of probabilities with respect to each possible classification, such as indicating a likelihood that a text string corresponds to each of a set of possible classifications. The predictions (e.g., label 310 predicted for text string 306) are compared to the known labels associated with the training inputs (e.g., known label 307 is the known label associated with text string 306) to determine the accuracy of spatial correction model 185, and spatial correction model 185 is iteratively adjusted until one or more conditions are met. For instance, the one or more conditions may relate to an objective function (e.g., a cost function or loss function) for optimizing one or more variables (e.g., classification accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for machine learning model 180, such as based on validation data and test data, as is known in the art.

For example, at step 320, parameters of the various layers of spatial correction model 185 are iteratively adjusted until output label 310 matches known label 307 or until some other condition is met, such as optimization of an objective function or the occurrence of a successive number of iterations with minimal or no improvement.

In some embodiments, back-propagation is used to train the model. Back-propagation generally refers to a process of calculating a gradient based on a loss function, comparing recreated input with the actual input. By propagating this gradient "back" through the layers of the model, the weights and/or other parameters can be modified to produce more accurate outputs on subsequent attempts to recreate the input.

A loss function is a type of objective function used to minimize "loss" (e.g., the value calculated by the loss function) during training iterations for a machine learning model. Components included in a loss function may relate to the determined accuracy of the machine learning model during a given training iteration with respect to one or more particular conditions.

Minimizing a loss function during model training generally involves searching for a candidate solution (e.g., a set of model parameters including weights and biases, and the like) that produces the lowest value as calculated by the custom loss function. According to certain embodiments of the present disclosure, an objective function such as a loss function is designed to minimize classification inaccuracy (e.g., prioritizing accuracy of predicted labels such as predicted label 310).

In certain embodiments, the layers of spatial correction model 185, such as an embedding layer, one or more bi-directional LSTM layers, and a dense layer, may be trained based on classification accuracy. Thus, spatial correction model 185 may be trained to generate character-level embeddings that are best suited for accurately classifying text strings, such as text strings from spreadsheets that commonly contain text other than words, based on the text strings themselves as well as spatial context information such as one or more immediately preceding text string and/or labels associated with one or more preceding text strings.

Once trained, spatial correction model 185 may be used as described herein to correct automatic classifications of text strings produced using a different automated classification technique (e.g., prediction model 180 of FIG. 1), such as for automatically extracting text from spreadsheets.

Example Label Correction

Figure 4:
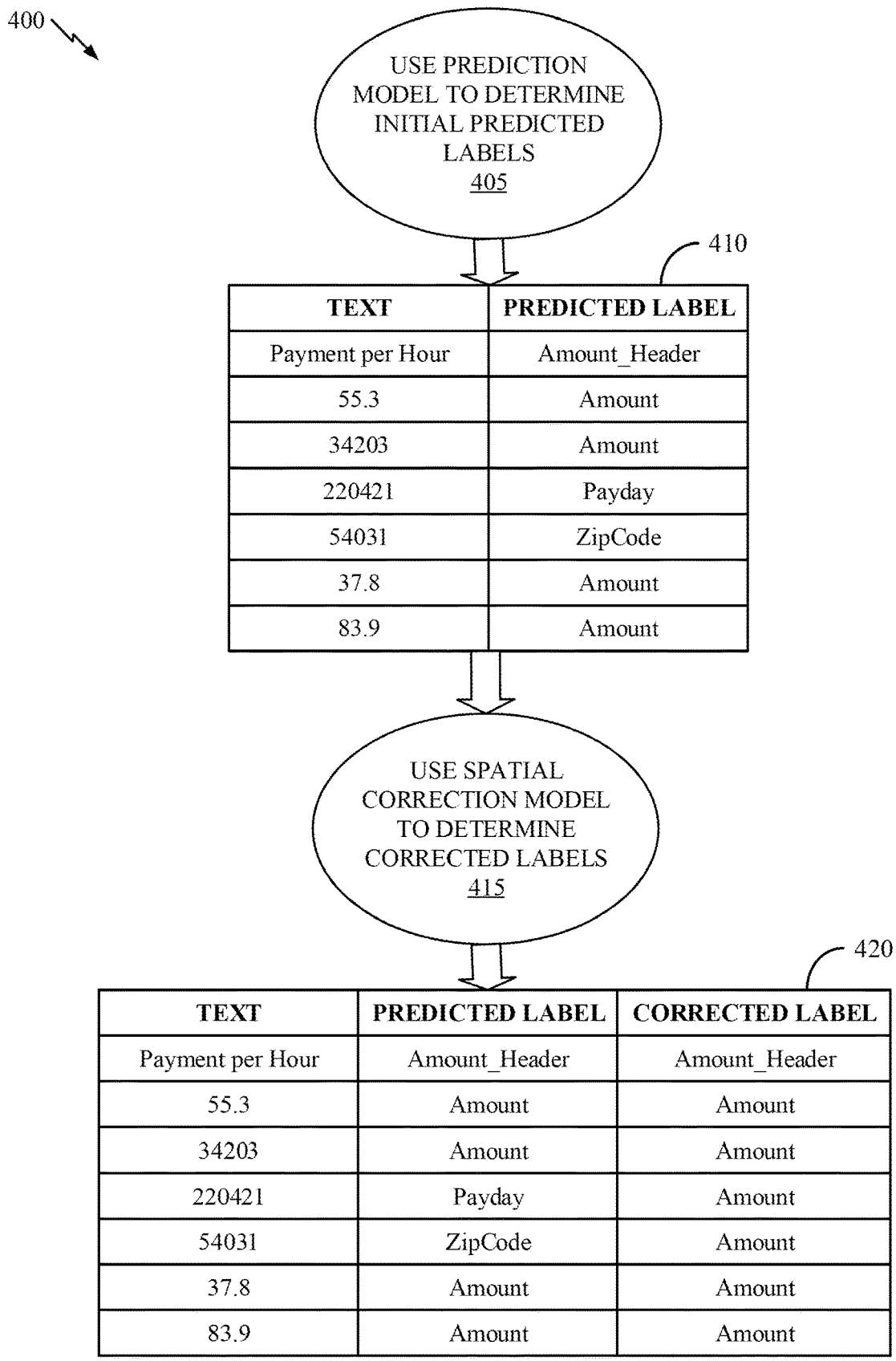
FIG. 4 depicts an example of correcting automatic classifications of text strings according to techniques described herein.

FIG. 4 is an illustration 400 correcting automatic classifications of text strings according to techniques described herein.

At step 405, a prediction model is used to determine initial predicted labels for a set of consecutive text strings from a document, as shown in table 410. For example, prediction model 180 may be used to determine labels 106 for text strings 104 of FIG. 1, as described above.

In table 410, text string "Payment per hour" is associated with the predicted label "Amount_Header," text string "55.3" is associated with the predicted label "Amount," text string "34203" is associated with the predicted label "Amount," text string "220421" is associated with the predicted label "Payday," text string "54031" is associated with the predicted label "ZipCode," text string "37.8" is associated with the predicted label "Amount," and text string "83.9" is associated with the predicted label "Amount."

At step 415, a spatial correction model is used to determine corrected labels for the text strings, as shown in table 420. For example, spatial prediction model 185 may be used to determine corrected label(s) 108 of FIG. 1.

The first two columns of table 420 correspond to table 410, and the third column of table 420 lists corrected labels determined at step 415. The corrected labels are the same for all of the text strings except "220421" and "54031." In table 420, the label for "220421" has been corrected from the initial prediction of "Payday" (e.g., which may have been determined based on the text string itself appearing to conform to a YYMMDD structure associated with a payday) to "amount." Similarly the label for "54031" has been corrected from the initial prediction of "ZipCode" (e.g., which may have been determined based on the text string itself appearing to conform to a 5-digit structure and range associated with a zip code) to "amount."

For example, to determine the corrected label for "220421," the feature set [220421, 34203, amount, amount] may have been provided as inputs to the spatial correction model, and the corrected label of "Amount" may have been output by the spatial correction model. Similarly, to determine the corrected label for "54031," the feature set [54031, 220421, amount (e.g., which is the corrected label for 220421), amount] may have been provided as inputs to the spatial correction model, and the corrected label of "Amount" may have been output by the spatial correction model.

Thus, the spatial correction model may utilize spatial context information to determine more accurate classifications of text strings that would otherwise be misclassified based on automated classifications techniques that utilize only the text strings themselves as inputs. For example, while "220421" by itself may appear to be a date in YYMMDD format, it is clear from the text string(s) preceding "220421" in previous rows of the spreadsheet (e.g., "34203," which does not conform to a date format) and the labels assigned to preceding text strings from previous rows of the spreadsheet (e.g., the labels of the two immediately preceding text strings are "Amount") that "220421" actually represents an amount.

Figure 5:
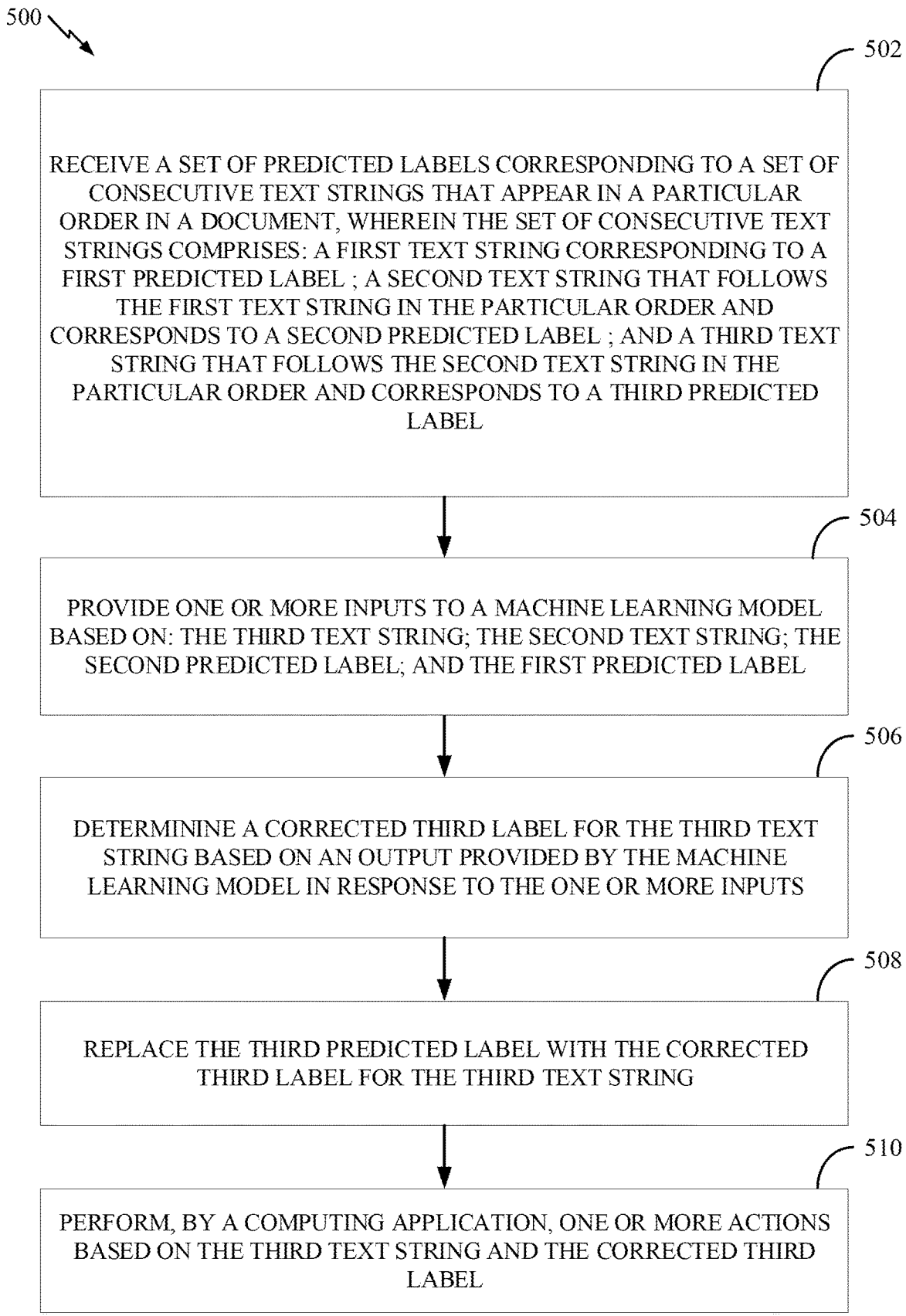
FIG. 5 depicts example operations related to automated data classification error correction through machine learning.

Example Operations for Automated Data Classification Error Correction Through Machine Learning FIG. 5 depicts example operations 500 for automated data classification error correction through machine learning. For example, operations 500 may be performed by data classification engine 713 of FIG. 7 and/or additional components depicted in FIGS. 1-3.

Operations 500 begin at step 502 with receiving a set of predicted labels corresponding to a set of consecutive text strings that appear in a particular order in a document, wherein the set of consecutive text strings comprises: a first text string corresponding to a first predicted label of the set of predicted labels; a second text string that follows the first text string in the particular order and corresponds to a second predicted label of the set of predicted labels; and a third text string that follows the second text string in the particular order and corresponds to a third predicted label of the set of predicted labels.

Operations 500 continue at step 504, with providing one or more inputs to a machine learning model based on: the third text string; the second text string; the second predicted label; and the first predicted label.

In some embodiments, the machine learning model determines character-level embeddings of a plurality of characters from the third text string and the second text string. For example, each respective character-level embedding of the character-level embeddings may be a vector representation of a respective character of the plurality of characters. The machine learning model may have been trained to determine the character-level embeddings based on training data comprising features of text strings associated with known labels indicating known classifications of the text strings. In certain embodiments, the machine learning model determines one-hot encoded vectors representing the second predicted label and the first predicted label based on a set of possible labels. For example, the machine learning model may concatenate the one-hot encoded vectors with the character-level embeddings (e.g., after processing the character-level embeddings through one or more bi-directional LSTM layers).

In some cases, the machine learning model processes a result of the concatenating through one or more fully-connected layers. Furthermore, in some embodiments, the machine learning model processes one or more outputs from the one or more fully-connected layers, through a softmax layer to determine the corrected third label.

Operations 500 continue at step 506, with determining a corrected third label for the third text string based on an output provided by the machine learning model in response to the one or more inputs.

Operations 500 continue at step 508, with replacing the third predicted label with the corrected third label for the third text string.

Operations 500 continue at step 510, with performing, by a computing application, one or more actions based on the third text string and the corrected third label. In some embodiments, performing, by the computing application, the one or more actions based on the third text string and the corrected third label comprises one or more of: automatically populating a particular variable with the third text string based on the corrected third label; or providing output to a user via a user interface based on the third text string and the corrected third label.

Certain embodiments further comprise receiving user input related to the corrected third label and generating updated training data for re-training the machine learning model based on the user input and the third text string. Some embodiments further comprise using the machine learning model to determine a corrected fourth label for a fourth text string that follows the third text string in the particular order based on: the fourth text string; the third text string; the corrected third label; and the second predicted label.

Notably, operations 500 is just one example with a selection of example steps, but additional methods with more, fewer, and/or different steps are possible based on the disclosure herein.

Example Operations for Training a Machine Learning Model

Figure 6:
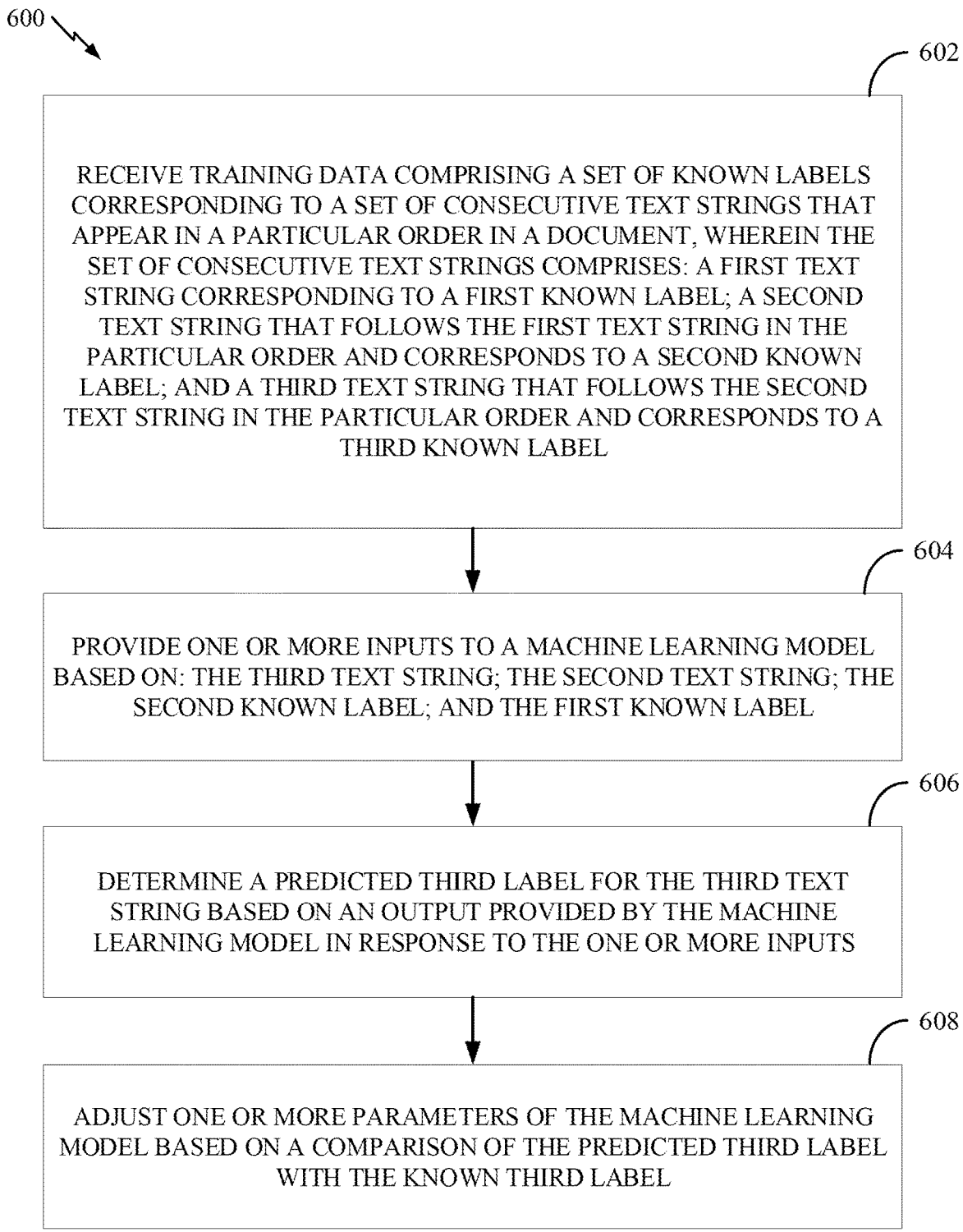
FIG. 6 depicts example operations related to training a machine learning model.

FIG. 6 depicts example operations 600 for training a machine learning model. For example, operations 600 may be performed by model trainer 718 of FIG. 7 and/or additional components depicted in FIGS. 1-3.

Operations 600 begin at step 602 with receiving training data comprising a set of known labels corresponding to a set of consecutive text strings that appear in a particular order in a document, wherein the set of consecutive text strings comprises: a first text string corresponding to a first known label of the set of known labels; a second text string that follows the first text string in the particular order and corresponds to a second known label of the set of known labels; and a third text string that follows the second text string in the particular order and corresponds to a third known label of the set of known labels.

Operations 600 continue at step 604, with providing one or more inputs to a machine learning model based on: the third text string; the second text string; the second known label; and the first known label.

In some embodiments, the machine learning model determines character-level embeddings of a plurality of characters from the third text string and the second text string via an embedding layer. For example, each respective character-level embedding of the character-level embeddings may be a vector representation of a respective character of the plurality of characters. Furthermore, adjusting the one or more parameters of the machine learning model based on the comparison of the predicted third label with the known third label may comprise adjusting one or more parameters of the embedding layer.

In certain embodiments, the machine learning model determines one-hot encoded vectors representing the second predicted label and the first predicted label based on a set of possible labels. Furthermore, the machine learning model may concatenate the one-hot encoded vectors with the character-level embeddings. In some cases, the machine learning model processes a result of the concatenating through one or more fully-connected layers.

Operations 600 continue at step 606, with determining a predicted third label for the third text string based on an output provided by the machine learning model in response to the one or more inputs.

Operations 600 continue at step 608, with adjusting one or more parameters of the machine learning model based on a comparison of the predicted third label with the known third label.

Notably, operations 600 is just one example with a selection of example steps, but additional methods with more, fewer, and/or different steps are possible based on the disclosure herein.

Example Computing System

Figure 7:
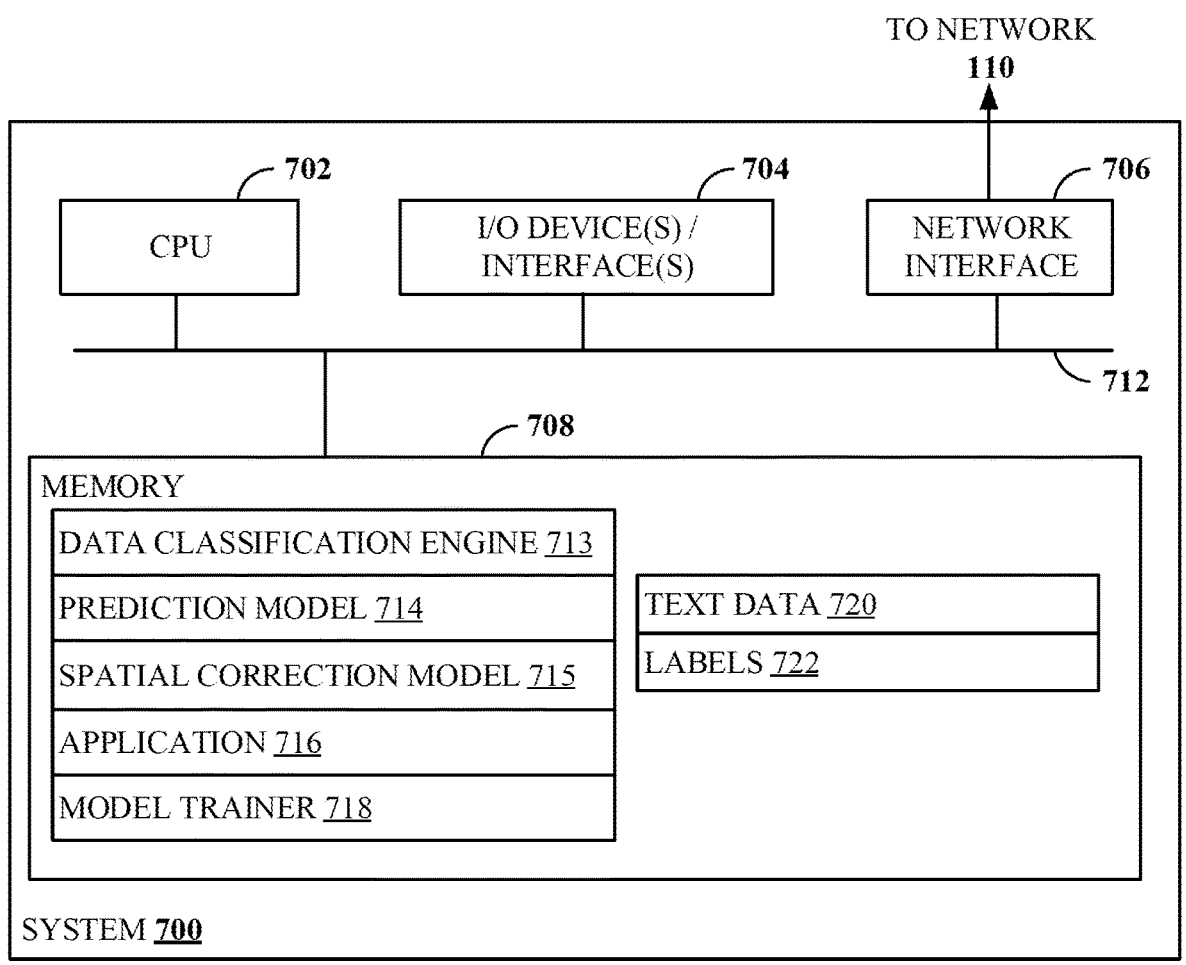
FIG. 7 depicts an example processing system for training and/or utilizing a machine learning model to correct automated classifications of text strings based on spatial analysis as described herein.

FIG. 7 illustrates an example system 700 with which embodiments of the present disclosure may be implemented. For example, system 700 may be configured to perform operations 500 of FIG. 5 and/or operations 600 of FIG. 6.

System 700 includes a central processing unit (CPU) 702, one or more I/O device interfaces 704 that may allow for the connection of various I/O devices 714 (e.g., keyboards, displays, mouse devices, pen input, etc.) to the system 700, network interface 706, a memory 708, and an interconnect 712. It is contemplated that one or more components of system 700 may be located remotely and accessed via a network 110. It is further contemplated that one or more components of system 700 may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes data classification engine 713, which may perform operations described herein related to automated data classification error correction through machine learning, such as operations 500 of FIG. 5. For example, data classification engine 713 may use prediction model 714 and/or spatial correction model 715 to automatically classify and/or correct classifications of text extracted from documents as described herein. Alternatively, data classification engine 713 may be part of application 716.

Memory 708 includes prediction model 714, spatial correction model 715, and application 716, which may be representative of prediction model 180, spatial correction model 185, and application 190 of FIG. 1. Memory 708 further comprises model trainer 718, which may perform operations related to training one or more machine learning models, such as prediction model 714 and/or spatial correction model 715. For example, model trainer 718 may perform operations 600 of FIG. 6.

Memory 708 further comprises text data 720, which may include text strings 104 of FIG. 1, text strings 202, 203, and 204 of FIG. 2, and text strings 302, 304, and 306 of FIG. 3. Memory 708 further comprises labels 722, which may include labels 106 and corrected label(s) 108 of FIG. 1, labels 205, 206, and 207 and corrected label 262 of FIG. 2, and known labels 303, 305, and 207 and label 310 of FIG. 3.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated data classification error correction through machine learning, comprising:
  receiving a set of predicted labels corresponding to a set of consecutive text strings that appear in a particular order in a document, wherein the set of consecutive text strings comprises:
    a first text string corresponding to a first predicted label of the set of predicted labels;
    a second text string that follows the first text string in the particular order and corresponds to a second predicted label of the set of predicted labels; and a third text string that follows the second text string in the particular order and corresponds to a third predicted label of the set of predicted labels;
providing one or more inputs to a machine learning model based on:
the third text string;
the second text string;
the second predicted label;
and the first predicted label;
wherein the machine learning model has been trained through a supervised learning process based on training data; and
wherein the machine learning model comprises:
one or more layers that generate embeddings based on the third text string and the second text string;
encoding logic that generates encodings of the second predicted label and the first predicted label;
concatenation logic that concatenates the embeddings with the encodings to produce a concatenated result, and
a softmax layer that generates one or more probabilities based on the concatenated result;
determining a corrected third label for the third text string based on an output provided by the machine learning model in response to the one or more inputs;
replacing the third predicted label with the corrected third label for the third text string;
receiving user input related to the corrected third label; and
generating updated training data for re-training the machine learning model based on the user input and the third text string, wherein the machine learning model is re-trained through a process in which parameters of the machine learning model are iteratively adjusted based on the updated training data.

2. The method of claim 1, wherein the machine learning model determines character-level embeddings of a plurality of characters from the third text string and the second text string, wherein:
each respective character-level embedding of the character-level embeddings is a vector representation of a respective character of the plurality of characters.

3. The method of claim 2, wherein the encoding logic determines one-hot encoded vectors representing the second predicted label and the first predicted label based on a set of possible labels.

4. The method of claim 3, wherein the concatenation logic concatenates the one-hot encoded vectors with the character-level embeddings.

5. The method of claim 4, wherein the machine learning model processes the concatenation result through one or more fully-connected layers.

6. The method of claim 5, wherein the machine learning model processes one or more outputs from the one or more fully-connected layers, through the softmax layer to determine the corrected third label.

7. The method of claim 1, further comprising:
automatically populating a particular variable with the third text string based on the corrected third label; or
providing output to a user via a user interface based on the third text string and the corrected third label.

8. The method of claim 1, further comprising using the machine learning model to determine a corrected fourth label for a fourth text string that follows the third text string in the particular order based on:

the fourth text string;
the third text string;
the corrected third label; and
the second predicted label.

9. A method for training a machine learning model, comprising:
receiving training data comprising a set of known labels corresponding to a set of consecutive text strings that appear in a particular order in a document, wherein the set of consecutive text strings comprises:
a first text string corresponding to a first known label of the set of known labels;
a second text string that follows the first text string in the particular order and corresponds to a second known label of the set of known labels; and
a third text string that follows the second text string in the particular order and corresponds to a third known label of the set of known labels;
providing one or more inputs to a machine learning model based on:
the third text string;
the second text string;
the second known label;
and the first known label; wherein the machine learning model comprises:
one or more layers that generate embeddings based on the third text string and the second text string;
encoding logic that generates encodings of the second known label and the first known label;
concatenation logic that concatenates the embeddings with the encodings to produce a concatenated result; and
a softmax layer that generates one or more probabilities based on the concatenated result;
determining a predicted third label for the third text string based on an output provided by the machine learning model in response to the one or more inputs; and
adjusting one or more parameters of the machine learning model based on a comparison of the predicted third label with the known third label.

10. The method of claim 9, wherein the machine learning model determines character-level embeddings of a plurality of characters from the third text string and the second text string via an embedding layer, wherein:
each respective character-level embedding of the character-level embeddings is a vector representation of a respective character of the plurality of characters; and
adjusting the one or more parameters of the machine learning model based on the comparison of the predicted third label with the known third label comprises adjusting one or more parameters of the embedding layer.

11. The method of claim 10, wherein the encoding logic determines one-hot encoded vectors representing the second known label and the first known label based on a set of possible labels.

12. The method of claim 11, wherein the concatenation logic concatenates the one-hot encoded vectors with the character-level embeddings.

13. The method of claim 12, wherein the machine learning model processes the concatenation result through one or more fully-connected layers.

* * * * *